May 8, 1928.
A. J. MOTTLAU
1,668,973
THERMOSTATIC REGULATOR
Filed July 11, 1924
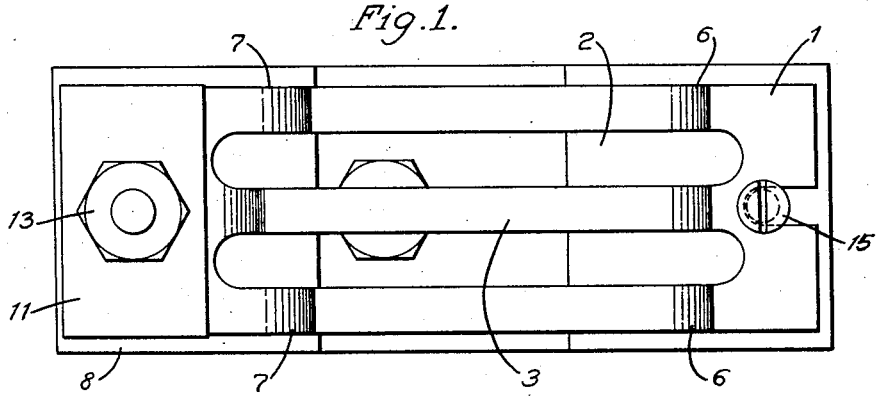
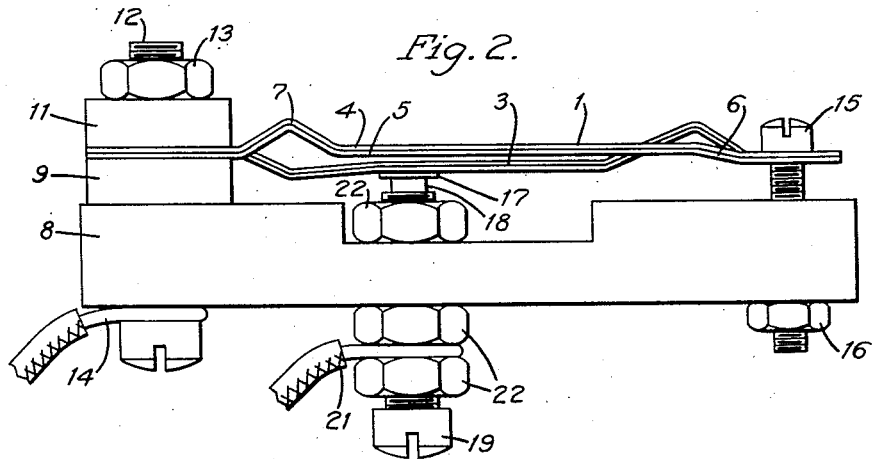
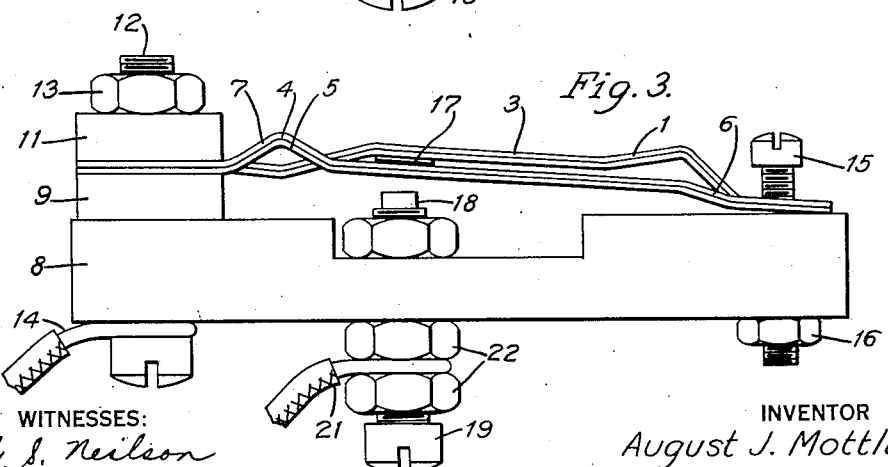
WITNESSES:
G. S. Neilson
Lester G. Budlong.
INVENTOR
August J. Mottlau
BY
Chesley G. Carr
ATTORNEY Patented May 8, 1928.

1,668,973

UNITED STATES PATENT OFFICE.

AUGUST J. MOTTLAU, OF PITTSBURGH, PENNSYLVANIA, ASSIGNOR TO WESTINGHOUSE ELECTRIC & MANUFACTURING COMPANY, A CORPORATION OF PENNSYLVANIA.

THERMOSTATIC REGULATOR.

Application filed July 11, 1924. Serial No. 725,408.

My invention relates to thermostatic regulators and particularly to bimetallic thermostats.

One object of my invention is to provide a thermostatic regulator that may be manufactured by a simple stamping operation.

Another object of my invention is to provide a thermostatic regulator that shall operate on very small changes of temperature of the order of one-half of a degree centigrade and less.

Another object of my invention is to provide a thermostatic regulator that shall operate upon very small changes in its thermal condition and at the same time shall have sufficient movement to directly interrupt circuits of relatively high voltages of the order of 110 volts direct current.

It is a further object of my invention to provide a thermostatic regulator having the foregoing characteristics that shall be adjustable within a relatively large range of operating values.

Figure 1 of the accompanying drawings is a plan view of a thermostat embodying my invention.

Fig. 2 is a side elevational view thereof in its circuit-making position, and

Fig. 3 is a view, similar to Fig. 2, showing the thermostat in its circuit-interruping posiion.

My invention comprises, in general, a thermostatic frame 1 having an aperture 2 therein that extends substantially longitudinally thereof and a bridging member 3 that extends across the aperture 2 parallel to the sides of the frame 1. The bridging member 3 is slightly longer than the length of the aperture 2, thereby defining a pre-shaped or curved surface.

The frame 1 is composed of materials having different coefficients of expansion, such as brass 4 and nickel steel alloy 5 that are welded, brazed or connected together in any suitable manner. The brass element of the thermostat is placed in the upper position in the thermostat and is slightly curved as at 6 and 7 in order to normally give the frame 1 a slightly concavo-convex shape in the direction of its greatest dimension.

The bridging member 3 may be of any resilient material, although I have found it preferable to stamp it from the same material as the frame member 1. When the stamping operation is employed for forming the bridging member 3, the metal thereof is stretched relatively to that of the frame 1 in the stamping operation. The frame 1 may also be shortened slightly, as by the curved portion 7, so that its effective over-all length is slightly less than that of the bridging member 3. In either process, the object is to so form the bridging member 3 relatively to the frame 1 that it bulges across the center line of the frame 1 in the direction from the material 4 of the frame 1 having the higher coefficient of expansion, when the thermostat is cold or in its circuit-closing position.

The thermostat is mounted on an insulating member 8 by means of insulating blocks 9 and 11, a bolt 12 and a nut 13. The bolt 12 also serves as a terminal for an electrical conductor 14. The other end of the thermostat is free to move within limits defined by the length of an adjusting bolt 15 that passes through the base member 8 and is secured thereto by a nut 16. The under surface of the bridging member 3 is provided with a contact plate 17 of silver, tungsten, or some other material having the property of resisting the deteriorating action of electrical arcs.

A stationary contact member 18 is provided for co-operation with the contact member 17 and is connected by a bolt 19 passing through the base 8, to an electrical conductor 21. The bolt 19 is provided with suitable adjusting and locking nuts 22 in order that the relative positions of the contact members 17 and 18 may be varied within a small range so that the operating temperature of the thermostat may be varied within a few degrees.

In operation, the thermostat is normally in the position shown in Fig. 2 with the contact members 17 and 18 in engagement with each other. However, the normal position of the thermostat may be made to be circuit-opening by placing the contact members 17 and 18 on the opposite side of the bridging member 3 from that shown. Also the movable contact member 17 may be insulated from the bridging member 3 if it is found desirable to have no current traversing the elements of the thermostat itself.

The bolt 15 is so adjusted that the center line of the frame 1 is inclined but a few degrees from a horizontal position and the bulk of the bridging member 3 is below the centerline of the frame 1. An increase in the temperature of the thermostat causes the frame 1 to tend to straighten itself and to reverse its curvature by reason of the greater expansion of the material 4 than that of the material 5. The change in shape of the frame 1 need not be abrupt but is preferably gradual.

By reason of the fact that the bridging member 3 is normally longer than the frame 1, movement of the frame 1 results in a reverse curvature and internal compression in the bridging member 3 whereby such stresses can only be liberated by the bridging member 3 seeking a new or stable curve. In case the bridging member 3 is composed of the same material as the frame 1, the difference in expansion of the metals 4 and 5 in the bridging member 3 itself increases the internal stresses therein and hastens the final change of position thereof. The shifting of the center line of the frame 1 relative to the center of mass of the bridging member 3 causes the latter to move upwardly into the position shown in Fig. 3 with an abrupt or snap action.

The change of the position of the bridging member 3 relative to the frame 1 results in the disengagement of the contact members 17 and 18 and the interruption of a circuit between the electrical conductors 14 and 21. Upon the cooling of the thermostat, the frame 1 slowly returns to the position shown in Fig. 2 and the direction of stresses in the bridging member 3 reverses, whereupon it snaps back into the position shown in Fig. 2 and the circuit is completed between the contact members 17 and 18.

I have found that, with the material in the frame 1 of substantially five thousandths of an inch thick, it is possible to regulate a current of six amperes at 110 volts direct current within a range of less than a half a degree centigrade. The thermostat is adjustable so that its range of operation may be varied within approximately thirty degrees before it becomes necessary to employ a frame 1 of different dimensions, such as an increase in length or in thickness of material.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a thermostat, an apertured frame composed of layers of material having different co-efficients of expansion, the frame being so shaped that in its normal position it is slightly concave on the side having the material possessing the higher co-efficient of expansion, and a bridging member spanning the aperture and having an effective length greater than the length of the aperture, the center of mass thereof normally being disposed at one side of the central plane of the frame, and moving its center of mass across the central plane of the frame with a snap action after a predetermined expansion of the initially concaved material by reason of changes in its thermal condition.

2. In a circuit-controlling device, a metal plate having an aperture therein and comprising side portions and a bridging member integral at both of its ends with the plate and extending across the aperture, the length of the bridging member differing from that of the aperture.

3. In a circuit-controlling device, a metal plate having an aperture therein and the side portions thereof being deformed laterally from the plane of the plate, and a bridging member that extends across the aperture, is integral with the plate and longer than the aperture.

4. In a circuit-controlling device, a metal plate having an aperture therein, portions of the plate at the sides of the aperture being deformed laterally from the plane of the plate, and a bridging member integral with the plate and extending across the aperture.

5. In a circuit-controlling device, a metal plate having an aperture therein extending longitudinally thereof, the side portions of the plate being deformed laterally from the plane of the plate, and a bridging member, having a portion thereof deformed laterally from the plane of the plate, extending across the aperture.

6. In a circuit-controlling device, a metal plate having an aperture therein extending longitudinally thereof, the side portions of the plate being deformed laterally from the plane of the plate, and a bridging member integral with the plate having a portion thereof deformed laterally from the plane of the plate, extending across the aperture.

7. A circuit-controlling device comprising a single plate having an aperture therein, a bridging member extending across the aperture, both the side portions of the plate and the bridging member having portions extending laterally from the plane of the plate, and a stationary contact member operatively engaging the bridging member.

8. A circuit-controlling device comprising a single plate having an aperture therein, a bridging member extending across the aperture, both the side portions of the plate and the bridging member having portions extending laterally from the plane of the plate, and a stationary contact member operatively engaging the bridging member with a pressure that varies in accordance with the stresses within the plate.

9. A circuit-controlling device comprising a single plate having an aperture therein, a bridging member extending across the aperture, both the side portions of the plate and the bridging member having portions extending laterally from the plane of the plate, supporting means for the plate, and a stop member operatively engaging the bridging member, whereby upon the occurrence of predetermined stresses within the plate tending to increase the pressure upon the stop member, the bridging member suddenly changes its position relatively to the plane of the plate.

10. A circuit-controlling device comprising a single plate having an aperture therein, a bridging member extending across the aperture, both the side portions of the plate and the bridging member having portions curved laterally from the plane of the plate such that the bridging member is normally at one side of the plane of the plate, supporting means for the plate, and a stop member operatively engaging the bridging member, whereby upon the occurrence of predetermined stresses within the plate tending to increase the pressure upon the stop member, the bridging member suddenly moves a portion thereof across the plane of the plate.

11. In a thermostat, in combination, a thermo-responsive member having an aperture therein, portions of the member at the sides of the aperture being deformed laterally from the plane of the member, and a bridging member integral with the thermal-responsive member, extending across the aperture.

12. In a thermally-actuated device, in combination, a bimetallic plate having an elongated aperture therein extending longitudinally thereof, the side portions of the plate being deformed laterally from the plane of the plate adjacent to one end thereof, and a bimetallic bridging member extending across said aperture and having a part thereof extending laterally from the plane of the plate.

13. In a thermally-actuated device, in combination, a bimetallic plate having an elongated aperture therein extending longitudinally thereof, both side portions of the plate being deformed laterally from the plane of the plate adjacent to one end thereof, and a bridging member, integral with said plate, extending across said aperture and having one part thereof deformed laterally from the plane of the plate adjacent to the other end thereof.

14. A thermostatic switch comprising a single sheet of bimetallic material having an elongated aperture therein, an integral bridging member extending across said aperture, both the side portions of the plate and the bridging member having portions deformed laterally from the plane of the sheet, and a stationary contact member operatively engaging the bridging member in accordance with the temperature of the sheet.

15. A thermostatic switch comprising a single sheet of bimetallic material having an elongated aperture therein, an integral bridging member extending across said aperture, both the side portions of the plate and the bridging member having portions deformed laterally from the plane of the sheet, and a stationary contact member normally operatively engaged by the bridging member with a pressure that increases with an increase of temperature up to a predetermined value.

16. A thermostatic switch comprising a single sheet of bimetallic material having an elongated aperture therein, an integral bridging member extending across said aperture, both the side portions of the plate and the bridging member having portions deformed laterally from the plane of the sheet, and a stationary contact member normally operatively engaged by the bridging member with a pressure that increases with an increase of temperature up to a predetermined value and then disengaged therefrom with a snap action.

17. In a thermally-actuable device, in combination, a substantially fixed contact member, a bimetallic plate having an elongated aperture therein extending longitudinally thereof, and a bridging member of the same material as the plate and secured thereto, extending across the aperture and normally operatively engaging the contact member, both the side portions of the plate and the bridging member having portions thereof curved laterally from the plane of the plate, whereby an initial variation of the temperature of the device of a predetermined amount effects an increase in the pressure between the bridging member and the contact member.

18. In a thermally-actuable device, in combination, a substantially fixed contact member, a bimetallic plate having an elongated aperture therein extending longitudinally thereof, and a bridging member of the same material as the plate and secured thereto, extending across the aperture and normally operatively engaging the contact member, both the side portions of the plate and the bridging member having portions thereof curved laterally from the plane of the plate, whereby a variation in the temperature of the device initially effects an increase in the pressure between the contact member and the bridging member and then effects disengagement therebetween with a snap action.

19. A temperature-responsive device comprising a bimetallic plate embodying a plurality of sections that are of different form laterally of the plane of said plate, said sections having relatively different speeds of movement when subjected to temperature variations.

20. A temperature-responsive device comprising a bimetallic plate embodying a plurality of sections that are of different form laterally of the plane of said plate, certain of said sections moving slowly in response to temperature changes and effective to cause a sudden movement of another of said sections at a predetermined temperature.

21. A bimetallic thermostat comprising an apertured bimetallic plate having portions thereof deformed laterally of the plane of the plate, and a bridging member for the aperture having an end portion deformed laterally of its longitudinal plane, said bridging member being longer than the aperture.

22. A thermoresponsive circuit-controlling device comprising a base member, an apertured bimetallic frame member having a bridging member integral therewith for the aperture thereof that is adapted to deflect therethrough with a snap motion, said frame member having one end secured to the base member, and means for adjustably biasing the other end of said frame member in accordance with a predetermined thermal condition at which said frame shall be operable to actuate the bridging member through the aperture.

23. A circuit-controlling device comprising a metal plate having an aperture therein and a bridging member for the aperture that is integral with the metal plate, a contact member mounted in operative relation with said bridging member, and means associated with said plate for varying the initial pressure of the bridging member on the contact member.

24. A circuit-controlling device comprising a metal plate having an aperture therein and a bridging member for the aperture that is integral with the metal plate, an adjustable contact member mounted in operative relation with said bridging member, and means associated with said plate for varying the initial pressure of the bridging member on the contact member.

25. A circuit-controlling device comprising a metallic plate having an aperture therein, and a bridging member for the aperture both ends of which are integral with the plate, said bridging member having an end portion thereof deformed laterally of a plane containing the plate.

26. A thermally-actuable switch comprising a resilient frame having an elongated aperture therein, a bridging member secured to said frame and extending across said aperture, and adjustable means cooperating with said frame for applying an initial stress to said bridging member.

27. A thermally-actuable switch comprising a resilient bimetallic frame having an elongated aperture therein, a bridging member secured to said frame and extending across said aperture and adjustable means for applying an initial longitudinal stress to said bridging member.

28. An electric switch comprising a resilient frame member having an aperture therein, a bridging member of substantially greater length than the aperture disposed thereacross in operative engagement with said frame member, and means for changing the initial curvature of said frame member.

29. An electric switch comprising a thermo-responsive bimetallic frame member having an aperture therein, a bridging member of substantially greater length than the aperture disposed thereacross in operative engagement with said frame member, and means for changing the initial curvature of said frame member.

In testimony whereof, I have hereunto subscribed my name this first day of July, 1924.

AUGUST J. MOTTLAU.